(12) United States Patent  
Chi

(10) Patent No.: US 6,426,852 B1  
(45) Date of Patent: Jul. 30, 2002

(54) HEAD DRUM ASSEMBLY FOR TAPE RECORDER

(75) Inventor: Yong-ju Chi, Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/176,940

(22) Filed: Oct. 22, 1998

(30) Foreign Application Priority Data

Jun. 25, 1998 (KR) .............................. 98-24155

(51) Int. Cl.[7] ................................. G11B 5/52
(52) U.S. Cl. .................................... 360/271.9
(58) Field of Search ............... 360/107, 271.9

(56) References Cited

U.S. PATENT DOCUMENTS

| 4,829,401 A | | 5/1989 | Vranken ............... 361/380 |
| 5,010,432 A | * | 4/1991 | Fukushima et al. ......... 360/108 |
| 5,321,569 A | * | 6/1994 | Sakai ........................... 360/107 |
| 5,392,180 A | | 2/1995 | Hasegawa .................. 360/107 |

FOREIGN PATENT DOCUMENTS

| JP | 60-60704 | 4/1985 |
| JP | 61-160801 | 7/1986 |
| JP | 62-21203 | 1/1987 |
| JP | 2-9002 | 1/1990 |
| JP | 2-282903 | 11/1990 |
| JP | 2-282904 | 11/1990 |
| JP | 10-112002 | 4/1998 |

OTHER PUBLICATIONS

Patent Abstract of Japan 02–009002 Jan. 12, 1990.  
Patent Abstract of Japan 60–185204 Sep. 20, 1985.  
Patent Abstract of Japan 03–259402 Nov. 19, 1991.

* cited by examiner

Primary Examiner—Robert S. Tupper  
(74) Attorney, Agent, or Firm—Sughrue Mion, PLLC

(57) ABSTRACT

A head drum assembly for a tape recorder includes a stationary drum fixed on a main base of a deck and having a through-hole formed in the bottom thereof, and a rotary drum having a magnetic head and rotatably installed on the stationary drum by a rotation shaft. A flexible printed circuit is electrically connected to rotary transformers respectively installed in the rotary drum and the stationary drum, for transmitting an information signal read by the magnetic head to a main printed circuit board (PCB). A first connector is coupled to an end of the flexible printed circuit for electrically connecting the flexible printed circuit to the main PCB. The flexible printed circuit is drawn out directly downward via the through-hole so that the first connector is electrically connected to a second connector mounted to the main PCB.

1 Claim, 4 Drawing Sheets

HEAD DRUM ASSEMBLY FOR TAPE RECORDER

BACKGROUND OF THE INVENTION

1. Field of the Invention

The present invention relates to a rotary head drum assembly for a tape recorder and, more particularly, to a connection structure of a flexible printed circuit for electrically connecting a head drum assembly and a main printed circuit board (PCB). The connection structure is for transmitting to the main PCB an information signal read while a magnetic head scans a magnetic tape.

2. Description of the Related Art

A head drum assembly which rotates at a high speed for recording/reproducing information on/from a magnetic tape by a magnetic head is provided in a deck of a camera-incorporated tape recorder, e.g., a camcorder, or a VCR.

Referring to FIGS. 1 and 2, a conventional head drum assembly 100 installed in a tape recorder includes a rotary drum 120 rotatably supported by a rotation shaft 110 and in which a magnetic head "h" is installed, and a stationary drum 130 obliquely fixed to a drum base 11 mounted to a main base 10. The rotary drum 120 is rotatably coupled to the stationary drum 130 such that the rotation shaft 110 is supported by a bearing 111.

A stator core 140 around which a coil 141 is wound and a ring-shaped motor rotor 150, having a magnet 151 facing the stator core 140, are installed in the lower portion of the stationary drum 130. Reference numerals 121 and 131 of FIG. 2 represent a rotating rotary transformer and a fixed rotary transformer, installed in the rotary drum 120 and the stationary drum 130, respectively.

The rotating rotary transformer 121 and the fixed rotary transformer 131 are structured by a configuration of a plurality of concentric circles, and a coil (not shown) is wound in a concave groove (not shown) between the respective concentric circles. The coil wound around the rotating rotary transformer 121 is connected to the magnetic head "h", and the coil wound around the fixed rotary transformer 131 is connected to a flexible printed circuit 132 drawn out via a through-hole 130a formed at a side wall of the stationary drum 130. An end of the flexible printed circuit 132 is connected to a connector 133, and the connector is coupled to a connector holder 12 provided in the drum base 11 to be electrically connected to a connector 21 installed in the main PCB 20. Thus, the information signal read by a scanning operation of the magnetic head "h" is transmitted to the main PCB 20 through the flexible printed circuit 132.

According to the conventional head drum assembly having the above-described configuration, in order to transmit the information signal read by the scanning of the magnetic head "h" to the main PCB 20, the flexible printed circuit 132 connected to the fixed rotary transformer 131 is drawn out via the through-hole 130a formed at the side wall of the stationary drum 130 to be connected to the main PCB 20. Thus, the length of the flexible printed circuit 132 is excessively increased, which may cause noise.

Also, since the drum base 11 having the connector holder 12 for supporting the connector 133 must necessarily be mounted to the main base 10 to stably connect the flexible printed circuit 132 to the connector 133, the manufacturing cost increases.

SUMMARY OF THE INVENTION

To solve the above problems, it is an object of the present invention to provide an improved rotary head drum assembly for a tape recorder, by which the length of a circuit for connecting a rotary transformer of a stationary drum and a main printed circuit board (PCB) is greatly reduced, and the connecting structure of the rotary transformer and the main PCB is simplified.

To accomplish the above object of the present invention, there is provided a head drum assembly for a tape recorder including a stationary drum fixed on a main base of a deck and having a through-hole formed in the bottom thereof, a rotary drum having a magnetic head and rotatably installed on the stationary drum by a rotation shaft, a flexible printed circuit electrically connected to rotary transformers respectively installed in the rotary drum and the stationary drum, for transmitting an information signal read by the magnetic head to a main printed circuit board (PCB), and a first connector coupled to an end of the flexible printed circuit for electrically connecting the flexible printed circuit to the main PCB, wherein the flexible printed circuit is drawn out directly downward via the through-hole so that the first connector is electrically connected to a second connector mounted to the main PCB.

In this case, the first connector is fittingly coupled to the through-hole.

BRIEF DESCRIPTION OF THE DRAWINGS

The above objects and advantages of the present invention will become more apparent by describing in detail a preferred embodiment thereof with reference to the accompanying drawings, in which.

DESCRIPTION OF THE PREFERRED EMBODIMENT

Figure 3:
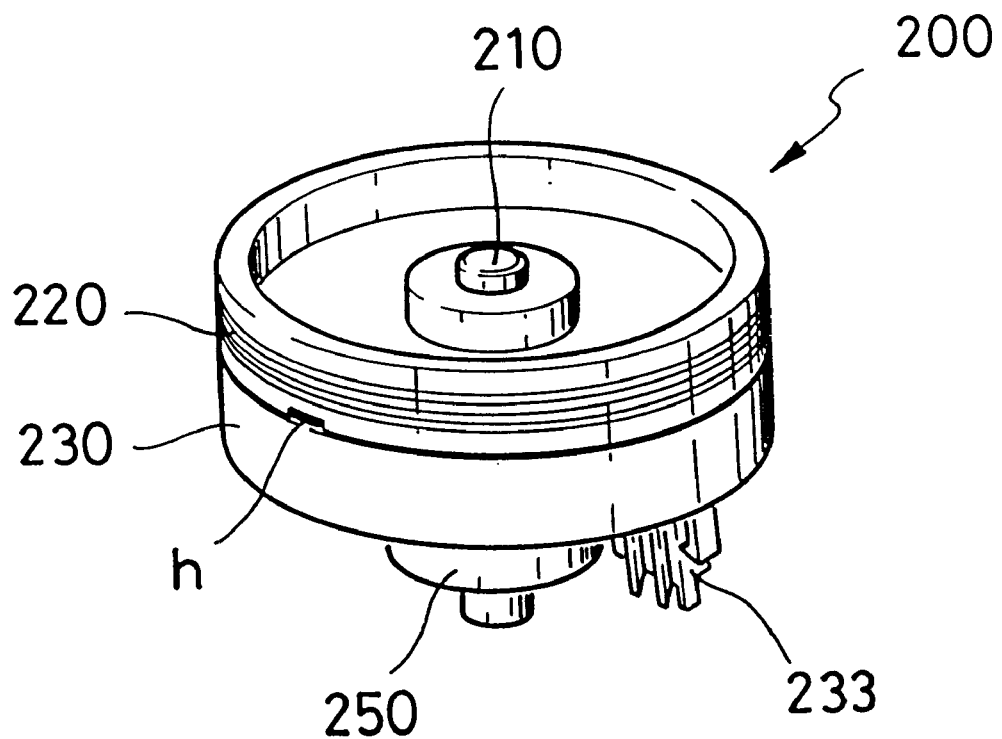
FIG. 3 is a schematic perspective view of a head drum assembly for a tape recorder according to the present invention.

Hereinbelow, a preferred embodiment of the present invention will be described in detail with reference to FIGS. 3 and 4. A rotary head drum assembly 200 according to the preferred embodiment of the present invention includes a rotary drum 220 to which a rotation shaft 210 is coupled and in which a magnetic head "h" is installed, a stationary drum 230 fixed to a main base 10' of a deck at the lower portion of the rotary drum 220, and a ring-shaped motor rotor 250 installed at the lower portion of the stationary drum 230. The rotary drum 220 is rotatably installed on the stationary drum 230 while the rotation shaft 210 is coupled to a bearing 211. Also, the motor rotor 250 includes a stator core 240 around which a coil 241 is wound, and a magnet 251 installed on the inner wall of the stator core 240 so as to face the same.

In this case, reference numeral 232 represents a flexible printed circuit for transmitting an information signal read by the magnetic head "h" to a main printed circuit board (PCB) 20'. Reference numerals 221 and 231 represent a rotating rotary transformer and a fixed rotary transformer, mounted to the rotary drum 220 and the stationary drum 230, respectively.

A plurality of concentric circles are formed on facing surfaces of the rotating rotary transformer 221 and the fixed rotary transformer 231, and a coil (not shown) is wound in a concave groove (not shown) between the respective concentric circles. The coil wound around the rotating rotary transformer 221 is connected to the magnetic head "h", and the coil wound around the fixed rotary transformer 231 is connected to the flexible printed circuit 232.

An important feature of the present invention is in that the connection structure of the flexible printed circuit 232 and the main PCB 20' is improved. The flexible printed circuit 232, as shown in FIG. 4, is drawn out directly downward via a through-hole 230*a* formed in the bottom of the stationary drum 232, so that an end of the flexible printed circuit 232 is connected to a first connector 233. The first connector 233 is fitted into the through-hole 230*a*.

The first connector 233 is electrically connected to a second connector 21' mounted to the main PCB 20', and thus transmits the information signal read by a scanning operation of the magnetic head "h" to the main PCB 20'.

Figure 1:
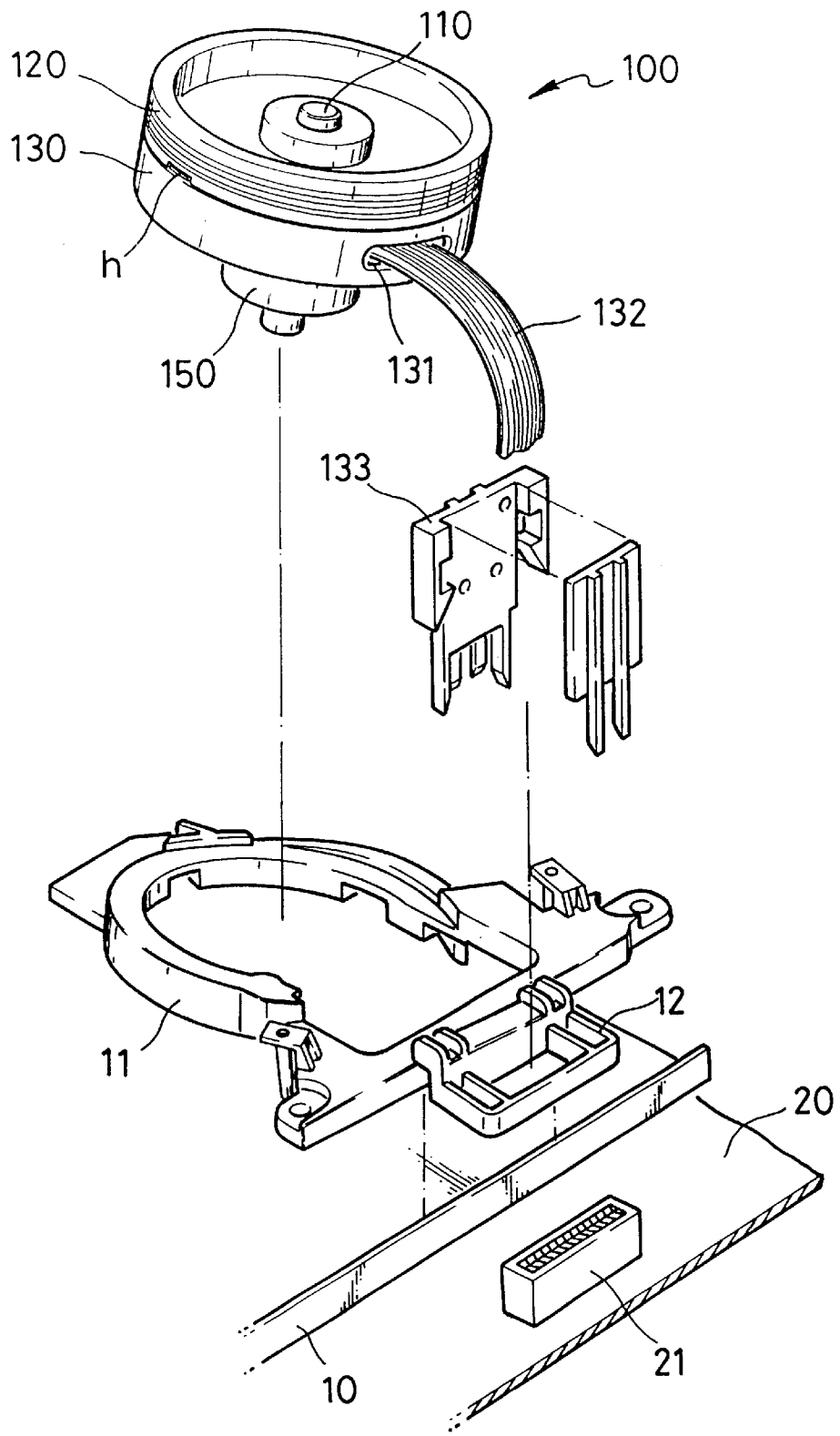
FIG. 1 is a schematic exploded perspective view of a conventional head drum assembly for a tape recorder.
Figure 2:
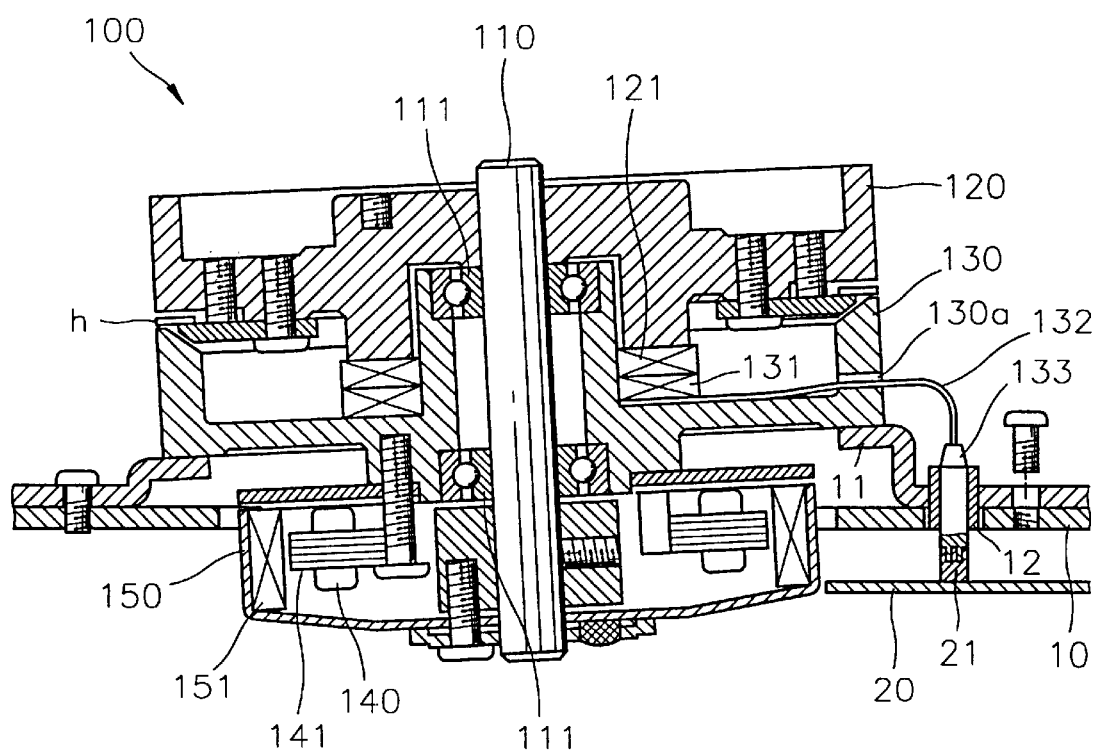
FIG. 2 is a cross sectional view of the conventional head drum assembly shown in FIG. 1.

According to the head drum assembly of the present invention, since the first connector 233 is strongly fitted into the through-hole 230*a*, the head drum assembly 200 can be coupled to the main base 10' of the deck, by easily connecting the first connector 233 and the second connector 21'. Also, since the connector holder 12 (see FIG. 1) separately provided for stably supporting the connector, as in the conventional art, is not necessary, the drum base 11 in which the connector holder is installed is likewise unnecessary.

Figure 4:
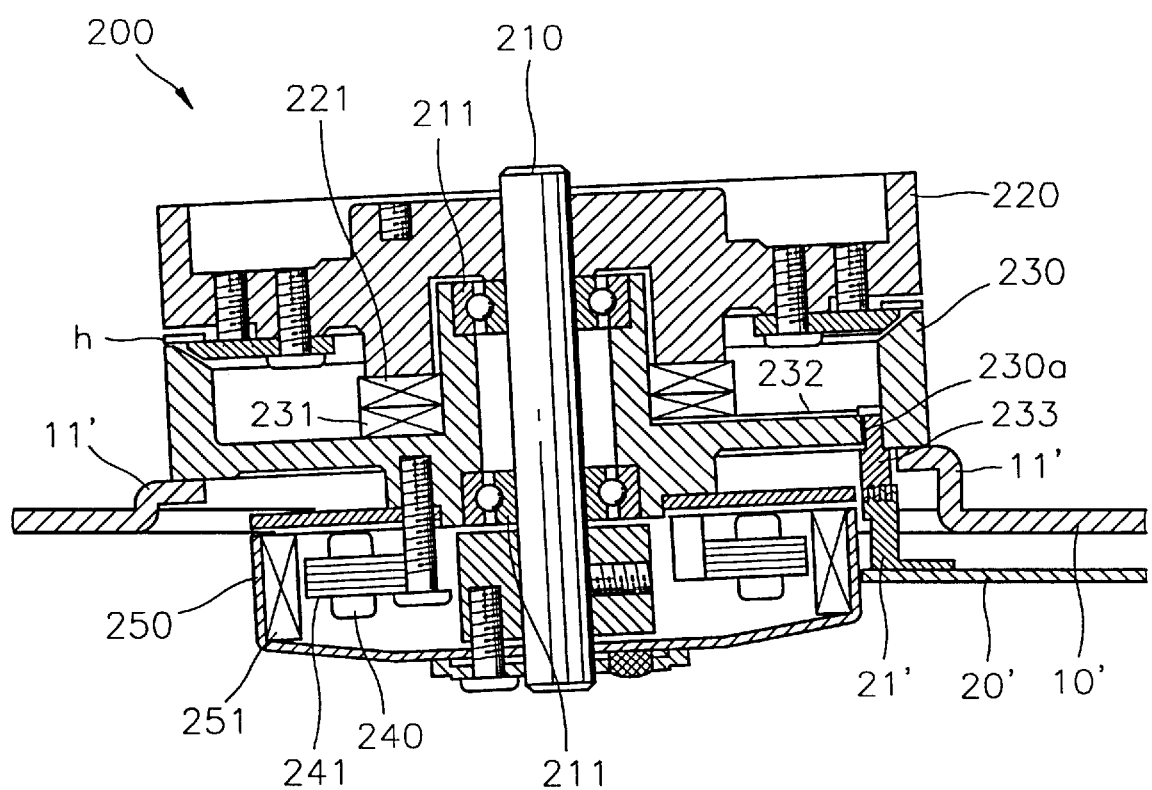
FIG. 4 is a cross sectional view of the head drum assembly shown in FIG. 3.

Further, as shown in FIG. 4, a protruding flange 11' is formed directly on the main base 10', thereby safely positioning the head drum assembly.

As described above, according to the rotary head drum assembly for a tape recorder of the present invention, the length of a flexible printed circuit can be greatly reduced, thereby suppressing inferiority due to a noise generated during recording/reproduction of information. Also, since a drum base for supporting a connector of the flexible printed circuit is not necessary, the manufacturing cost of the rotary head drum assembly can be reduced.

It is contemplated that numerous modifications may be made to the head drum assembly for tape recorder of the present invention without departing from the spirit and scope of the invention as defined in the following claims.

What is claimed is:

1. A head drum assembly for a tape recorder, comprising:

a stationary drum fixed on a main base of a deck and having a through-hole formed in a bottom thereof;

a rotary drum having a magnetic head and being rotatably installed on said stationary drum by a rotation shaft;

a flexible printed circuit disposed inside the stationary drum and having one end electrically connected to rotary transformers respectively mounted to the rotary drum and the stationary drum, for transmitting an information signal read by said magnetic head to a main printed circuit board (PCB) which is located outside the stationary drum; and a first connector coupled to an opposite end of said flexible printed circuit for electrically connecting said flexible printed circuit to the main PCB, wherein said first connector has a first end portion which is electrically connected to the opposite end of the flexible printed circuit and which is inserted into and fittingly coupled to said through-hole so as to extend directly downward via said through-hole, and a second end portion which extends beyond said through-hole and is electrically connected to a second connector mounted to the main PCB.

\* \* \* \* \*